UNITED STATES PATENT OFFICE.

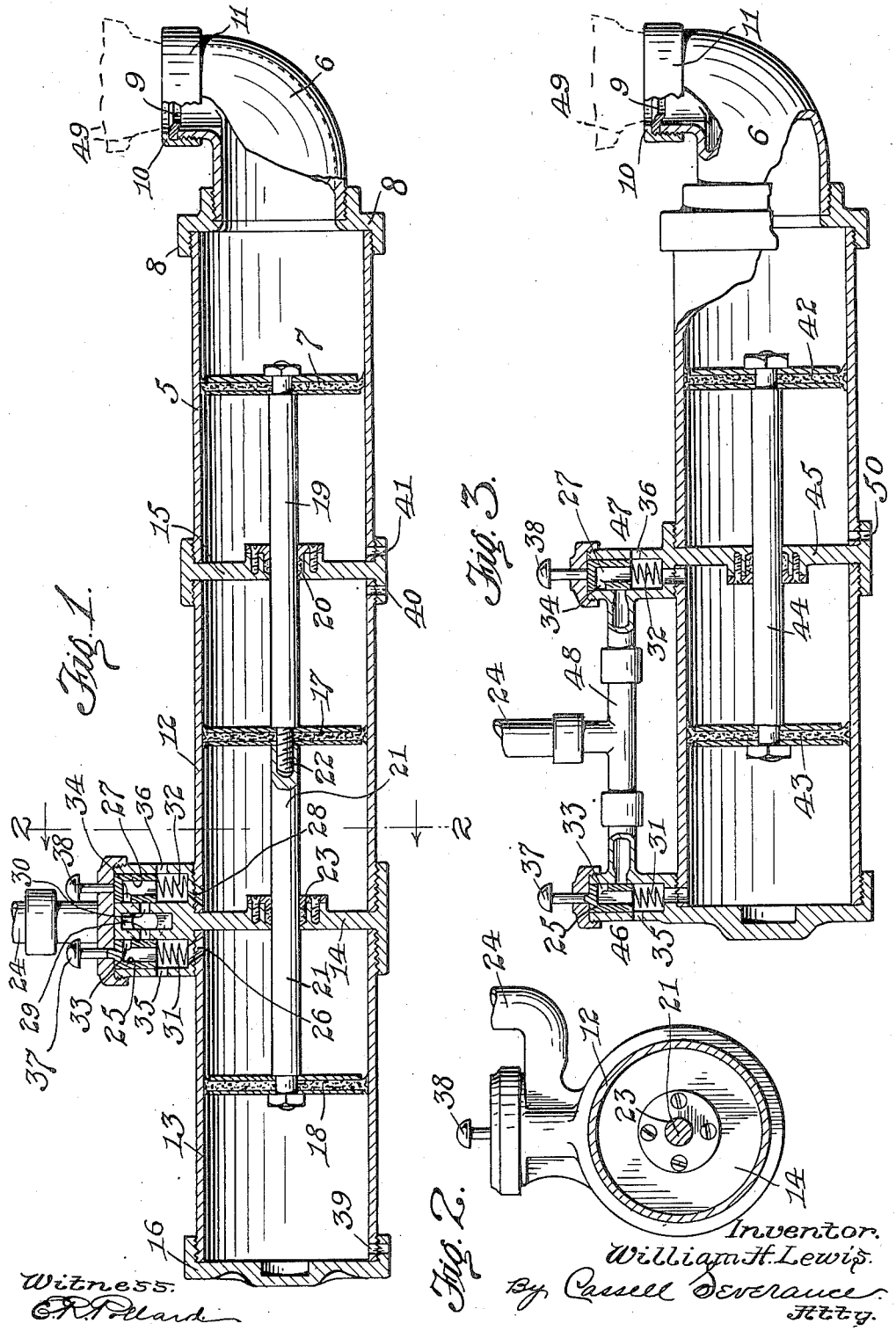

WILLIAM H. LEWIS, OF LOS ANGELES, CALIFORNIA.

GREASE-GUN.

1,210,179.	Specification of Letters Patent.	Patented Dec. 26, 1916.

Application filed October 18, 1915. Serial No. 56,438.

*To all whom it may concern:*

Be it known that I, WILLIAM H. LEWIS, a citizen of the United States, residing at Los Angeles, in the county of Los Angeles and State of California, have invented certain new and useful Improvements in Grease-Guns, of which the following is a specification.

This invention relates to improvements in grease guns and has particular relation to devices for forcing lubricants into mechanisms, gearing or other places where it cannot be properly inserted otherwise, as for instance in the gear box or cases upon automobiles and the like.

It is an object of the invention to provide a lubricant handling device in which the lubricants can be drawn into the said device and forced out therefrom by means of pneumatic or other pressure. It is also an object of the invention to provide a grease gun in which a lubricant moving piston is arranged and to provide valve controlling inlets and outlets for admitting pneumatic pressure, to move the said piston.

It is a further object of the invention to provide a grease gun with a nozzle adapted to be pressed against the grease receiving or discharging opening of a mechanism casing, means also being provided for forcing the grease through said nozzle by pneumatic pressure.

With these and other objects in view the invention comprises certain novel constructions, combinations and arrangements of parts as will be hereinafter more fully described and claimed.

In the accompanying drawing Figure 1 is a longitudinal central sectional view through a grease gun constructed in accordance with this invention. Fig. 2 is a transverse vertical sectional view taken upon the line 2—2 of Fig. 1. Fig. 3 is a longitudinal sectional view through a modified form of the grease gun, portions of the mechanism being shown in side elevation.

Heretofore it has been difficult to remove and replace firm lubricants or greases in certain kinds of machinery, where the lubricant must be forced in. It is also very difficult to do this manually particularly in the charging of gear casings or boxes such as are found upon motor vehicles. The device of the present invention is designed to make it possible not only to charge a casing, gear box or other portion of a mechanism with more or less firm grease but to withdraw the same again when it is necessary to replace the old grease with new. The device is so constructed that pneumatic or other fluid pressure may be employed for loading the gun with grease and charging the mechanism which is to be lubricated therewith, merely by holding the nozzle of the gun against the inlet or feed opening of the casing containing the mechanism to be lubricated. The details and features of the device will now be more specifically described reference being had to the drawing in which—

5 indicates the barrel or casing of a grease gun, 6 the nozzle employed thereon and 7 a piston operating in said barrel for moving the grease or lubricant. The barrel 5 is preferably cylindrical and a nozzle carrying ring 8 is screwed upon one end thereof, said ring having a flange carrying a large nozzle 6, the opening therein being thus well adapted for the passage of heavy lubricants or grease therethrough. The outer end of the nozzle is preferably provided with a tight joint forming washer 9 held in position by the flange 10 of a ring or collar 11 which is screwed upon the end of the nozzle 6. The washer affords a quick means of making a tight connection with the inlet to a casing or a lubricant receiving opening of any kind, the device being similar to that commonly employed on the compressed air pipes used in garages for application to valve stems in inflating pneumatic tires.

The grease gun comprises a barrel composed of sections 5, 12 and 13 which are joined by intermediate heads 14 and 15 having flanges into which the ends of the sections may be screwed. One end of the section 12 is also screwed into the flange of a head 15 which is secured upon the inner end of the section 5. A screw cap 16 is applied upon the outer end of the section 13 for closing the same. Power pistons 17 and 18 move in the said sections 12 and 13 respectively and the piston 17 is connected with the grease moving piston 7 by a piston rod 19 which passes through a packing gland 20 in the head 15. The piston rod 19 is connected with one end of a piston rod 21 to the other end of which is secured the piston 18.

The two piston rods have a screw and socket portion at 22 for joining them, the said piston 17 being shouldered against the adjacent end edges of the said pistons 19 and 21. The piston 21 passes through a packing gland 23 in the said head 14. It will be readily understood that by introducing air under pressure upon either side of the head 14, the pistons 17 and 18 may be made to move the piston 7.

The fluid pressure, preferably air is introduced from a supply pipe 24 through a valve mechanism having a valve 25 controlling a port 26 in the section 13, and having a valve 27 controlling an inlet port 28 in the section 12. The air enters the valve casing at the center as shown in Fig. 1, ports 29 and 30 being provided for delivering the air through either one of the valves when it is moved to the right position. The valves are normally kept in closed position against the inlet of air by springs 31 and 32. The pistons 25 and 27 are preferably hollow having inlet ports for air at 33 and 34 which communicate with the central bores thereof. The ends of the said bores next to the gun sections are open so that when either one of the ports 33 and 34 are brought opposite corresponding ports 29 and 30, the air can rush in through the valve and through the ports 26 and 28 as the case may be. When the valves are forced into closed position either gun section may exhaust through ports 35 and 36 in the walls of the valve casing. Valve stems with suitable heads 37 and 38 are provided and arranged to extend outside of the valve casing so that the inlet of air through either valve may be accomplished by pressing on either one of said stems.

When it is desired to load the gun with grease, the piston 7 being at the nozzle end of the section 5, the valve stem 37 is pressed by the thumb or finger of the operator, and air is introduced into the section 13 for forcing the piston 18 to the outer end of its movement, a relief port 39 being provided in the said section for permitting the air to escape from the outer end of said section. The movement of the piston 18 is communicated through the piston rods 19 and 21 to the lubricant forcing piston 7 and the suction in the section 5 will draw a charge of grease or other lubricant through the nozzle 6, if said nozzle is immersed in the grease. When the gun has been loaded in this way, the valve stem 37 is released and after applying the nozzle 6 to the opening into the casing or other receptacle which is to receive the lubricant, the valve stem 38 is pressed so as to open the valve 27. The air will then be introduced through the port 28 behind the piston 17 and the lubricant moving piston will be caused to force the grease out of the gun and into the mechanism, casing or the like which is to be supplied with the lubricant. The air between the piston 17 and the head 15 escapes from the section 12 or reënters through a relief port 40. A similar relief port 41 is also provided in the section 5, next to the head or partition 15. The relief ports 39, 40 and 41 are so placed as to leave the pistons 7, 17, and 18 free to operate under the influence of the incoming compressed air. The sections of the casing 12 and 13 between the pistons 17 and 18 exhaust through the ports 35 and 36.

The construction and arrangement of the parts may be considerably varied without departing in the least from the spirit of the invention. Thus as shown in Fig. 3 the device may be somewhat shortened by employing one grease moving piston as 42 and one power piston 43 connected by a piston rod 44, which passes through a head or partition 45. In this instance the air inlet valves 46 and 47 are placed at the ends of the compartments occupied by the piston 43 so that the air is introduced first at one end of said compartment and then at the other for forcing the piston 43 back and forth and actuating the grease moving piston 42. The exhaust from the ends of said compartment is through the valve mechanisms as heretofore described with respect to the device shown in Fig. 1. With the valve mechanism 46 and 47 spread apart as shown in Fig. 3 an intermediate connecting pipe 48 is employed and centrally connected with the air supply pipe 24. In other respects the device is substantially the same as that described with respect to Fig. 1 of the drawing. The space behind the piston 42 has a relief port 50.

Either form of the device is admirably adapted for moving the lubricants especially firm grease and the like under pressure. The grease gun is adapted for use in any garage or place where air is always kept under pressure, as for instance that used in inflating tires. In removing grease from differential gear casings or from shifting gear boxes, it is frequently a tedious and long job to get the grease out when it is to be removed or when parts of the mechanism are to be repaired or examined. With the device of the present invention it is only necessary to press the end of a nozzle 6 against the opening in the bottom of the casing or box, as indicated for instance in dotted lines at 49, to be able to withdraw the grease from the bottom of the casing. If one stroke of the piston does not draw out all of the grease, the gun may be emptied and again applied to the gear casing until all of the grease has been withdrawn. The operation can then be reversed for charging the gear casing with a new supply of lubricant.

It should be understood that any desired type of air controlling valves may be used in the place of those described, and that any kind of a nozzle may be employed with any kind of connection or joint forming means aside from what is shown in the drawing, all within the spirit and scope of the invention.

What is claimed is:

1. A grease gun having a lubricant moving member and means for forcing said member back and forth by fluid pressure to discharge or draw in lubricants.

2. A grease gun having a lubricant moving piston, means for applying fluid pressure to the device for moving the piston in one direction for drawing a lubricant into the gun and in the other direction for forcing said lubricant out of the gun.

3. A grease gun having a grease moving piston, a power piston connected therewith and means for delivering fluid pressure to either side of said power piston to move a firm lubricant either by pressure or by suction.

4. A grease gun having a barrel portion, a pneumatically reciprocated piston therein and a nozzle having a joint forming means adapted to form a tight joint with the device that is to receive the grease and means for delivering air under pressure into said grease gun.

5. A grease gun having a cylinder, a grease moving piston therein, a power piston connected with the grease moving pistons, means for driving the power piston in either direction under fluid pressure, air inlet and exhaust valves for controlling the admission of air to either side of said piston and permitting the exhaust of air therefrom, a nozzle having an automatic joint forming end portion whereby a tight joint may be made for delivering the grease to a receptacle to be charged, by pressing the nozzle against the inlet opening of said receptacle.

6. A grease gun having a piston adapted to be pneumatically driven in each direction, and means for connecting the gun with a receptacle to be charged with grease or cleared thereof.

In testimony whereof I have hereunto set my hand in presence of two witnesses.

WILLIAM H. LEWIS.

Witnesses:
HENRY P. MURRAY,
F. C. CONDY.